United States Patent Office 3,211,734
Patented Oct. 12, 1965

3,211,734
SUBSTITUTED 1-(4-PHENYL-BUTYL)-4-PHENYL-PIPERAZINE COMPOUNDS
Henri Morren, Forest-Brussels, Belgium, assignor to UCB (Union Chimique-Chemische Bedrijven), S.A., Brussels, Belgium, a corporation of Belgium
No Drawing. Filed Apr. 10, 1963, Ser. No. 271,892
Claims priority, application Great Britain, Apr. 16, 1962, 14,617/62; July 19, 1962, 27,845/62
13 Claims. (Cl. 260—268)

The present invention relates to new piperazine derivatives and to the preparation thereof.

These new piperazine derivatives may be represented by the general formula:

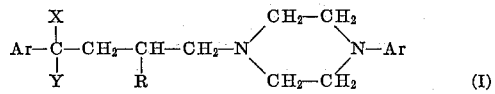

(I)

wherein each Ar represents a phenyl radical, which may be substituted, Y represents a member selected from the group consisting of hydrogen and a phenyl radical, R represents a member selected from the group consisting of hydrogen and a methyl radical and X is selected from the group consisting of —CN and

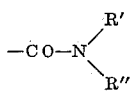

where R' and R'' taken separately each represents a member of the class consisting of hydrogen and alkyl and taken together represent with the adjacent nitrogen atom a heterocyclic group, more particularly a pyrrolidino group.

The invention relates also to the inorganic and organic acid addition salts of said piperazine derivatives.

According to the present invention, the derivatives of the Formula I wherein X is selected from the group consisting of —CN and

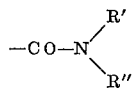

where R' and R'' taken separately represent an alkyl radical and taken together represent with the adjacent nitrogen atom a heterocyclic group, are prepared by reacting a compound of the structure

with a substituted piperazine of the structure

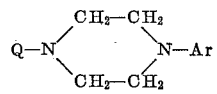

Z and Q being such that they form the radical

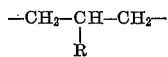

during the reaction, Ar, Y and R having the same meanings as above.

The derivatives of the above general Formula I wherein X is a —CONH$_2$ radical are obtained by hydrolyzing the corresponding nitriles with an acid, such as sulfuric acid.

The inorganic and organic acid addition salts of the derivatives of the invention are prepared according to known methods by reacting the corresponding free bases with an inorganic or organic acid.

The compounds of the above general Formula I in which X is —CN may be prepared in particular by two methods:

(a) By reacting a 1-Ar-piperazine of the formula:

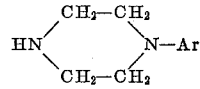

in which Ar has the same meaning as above, with a 1-halo-2-R-4-Ar-4-cyano-4-Y-butane of the formula

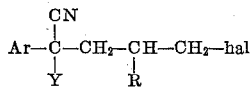

in which Y, Ar and R have the same meanings as above and hal is a halogen atom, in the presence of a hydrohalic acid acceptor, or (b) By the action of an alkali metal or alkaline earth metal derivative of a 2-A-2-Ar-acetonitrile of the formula:

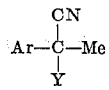

in which Y and Ar have the same meanings as above and Me is an alkali metal or an alkaline earth metal, with a 1-(2'-R-3'-halopropyl)-4-Ar-piperazine of the formula:

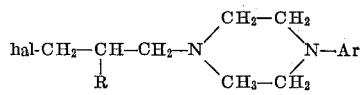

in which Ar and R have the same meanings as above and hal is a halogen atom.

The 1-halo-2-R-4-Ar-4-cyano-4-Y-butanes used as starting materials in reaction (a) may be prepared:

(i) By reacting a 1-bromo-2-R-3-halopropane of the formula

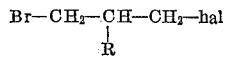

in which R has the same meaning as above and hal is a halogen atom, with a 2-Y-2-Ar-acetonitrile of the formula:

in which Y and Ar have the same meanings as above, in the presence of sodamide, or (ii) By reacting a 2-Y-2-Ar-acetonitrile with a 2-(2'-R - 3' - halopropoxy) - tetrahydropyrane, hydrolyzing the compound obtained in an acidic medium and halogenating the substituted butanol formed for example with thionyl chloride. The reactions involved can be illustrated by the following equation:

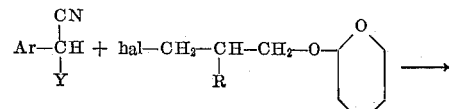

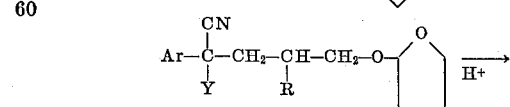

in the above equation, Y, Ar, R and hal have the same meanings as above.

The 1 - (2' - R - 3' - halopropyl) - 4 - Ar - piperazines which are used in reaction (b) are obtained by the action of a 1,3-dihalo-2-R-propane with a 1-Ar-piperazine or by the action of thionyl chloride on a 1-(2'-R-3'-hydroxypropyl)-4-Ar-piperazine.

With regard to the piperazine derivatives of the above general Formula I in which X represents a

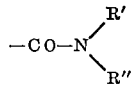

radical, they may be prepared in particular:

(c) By the direct action of a 1-(2'-R-3'-halopropyl)-4-Ar-piperazine of the formula:

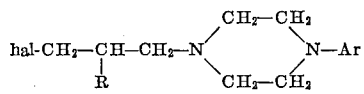

in which Ar, R and hal have the same meanings as above, with an alkali metal or alkaline earth metal derivative of an N-(R',R")-2-Y-2-Ar-acetamide of the formula:

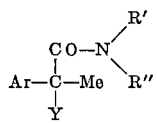

in which Y and Ar have the same meanings as above, Me is an alkali metal or alkaline earth metal, and R' and R" taken separately represent an alkyl radical, and taken together, represent with the adjacent nitrogen atom, a heterocyclic group, or (d) By reacting a 1-Ar-piperazine of the formula

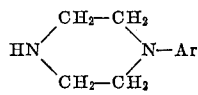

in which Ar has the same meaning as above, with a 1-halo-2-R-4-Ar-4-Y-4-[N-(R',R") - carbamyl] - butane of the formula:

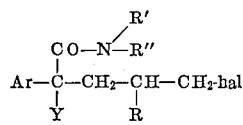

in which Y, Ar and R have the same meanings as above, hal is a halogen atom and R' and R" taken separately represent an alkyl radical and taken together represent with the adjacent nitrogen atom a heterocyclic group.

The butane derivatives used as starting materials in reaction (d) are obtained, for example, by the reaction of a 1-bromo-2-R-3-halopropane with an N-(R',R")-2-Y-2-Ar-acetamide (R' and R" having the same meanings as in (d)).

The new compounds of the present invention have interesting pharmacological activity; in particular, they are useful in the treatment of psychiatric affections situated between neuroses and psychoses. Their neurotropic activity varies from that of simple tranquilizers to reach potency close to that of psycholeptics, thereby having a completely different chemical structure; as a matter of fact, they do not contain a phenothiazine group generally responsible for the side effects observed with that type of products.

The activity of the compounds of the present invention has been proved more particularly using the following three tests:

APOMORPHINE ANTAGONISM

According to the method of P. A. J. Janssen et al. (Arzneimittel Forschung, 10 (1960), 1003–05), the minimum dose of compound is determined which, when administered subcutaneously, inhibits, in 50% of the rats (males of the Wistar breed) tested, the "obligatory gnawing" (Zwangsnagen) caused for at least 75 minutes by the intravenous injection of 1.25 mg./kg. of apomorphine hydrochloride.

The compound tested is administered to groups of 4 rats, one hour before the injection of the apomorphine hydrochloride. The animals are observed for 20 minutes and the presence or absence of "obligatory gnawing" is noted.

HYPOTONIA

According to the method of S. Levis et al. (Arch. int. Pharm. et Therap., 109 (1957), 127–242), the minimum dose of compound is determined which, when administered intraperitoneally or subcutaneously, causes, in 50% of the rats, hypotonia of the legs and of the nape of the neck, modifying the behaviour of the animal.

MOTILITY

According to the method of F. Moeyersoons (Proc. of the 3rd International Conference on Medical Electronics, London, 1960, 209), the action of the compounds on the motility of the mouse is determined.

The number of movements executed by two series of mice is recorded regularly. To a first series of ten mice, used as control animals, physiological saline solution (0.9% sodium chloride) is administered. To a second series of ten mice is administered orally a compound according to the invention (expressed in millimoles/kilogram body weight) and the dose is determined which reduces during a given period of time their motility to 50% of that of the control animals.

The results of some pharmacological tests carried out with certain compounds of the present invention and also with two reference compounds, namely a tranquilizer (hydroxyzine) and a psycholeptic (perphenazine) are shown in the following table:

|  | X | H | M |
|---|---|---|---|
| Hydroxyzine | >0.5 | 0.04 | 0.2 |
| Perphenazine | 0.0006 | 0.0003 | 0.005 |
| (1) | >0.5 | 0.03 | 0.1 |
| (2) | >0.3 | 0.01 | 0.1 |
| (3) | >0.3 | 0.01 | 0.02 |
| (4) | 0.01 | 0.001 | 0.02 |
| (5) | 0.003 | 0.0003 | 0.02 |
| (6) | 0.0003 | 0.0004 | 0.01 |

In this table, A=apomorphine antagonism, H=hypotonia, M=motility. The figures represent millimoles per kilogram body weight.

Compound (1) is 1-(4'-cyano-4'-phenyl-butyl)-4-(m-chlorophenyl)-piperazine dihydrochloride, Compound (2) is 1-(4'-carbamyl-4'-phenyl-butyl)-4-(m-chlorophenyl)-piperazine monohydrochloride, Compound (3) is 1-(4'-cyano-4'-p-chlorophenyl-butyl)-4-phenyl-piperazine dihydrochloride, Compound (4) is 1-(4'-cyano-4'-p-chlorophenyl-butyl)-4-(o-methoxyphenyl)-piperazine dihydrochloride, Compound (5) is 1-(4'-cyano-4'-phenyl-butyl)-4-(o-methoxyphenyl)-piperazine dihydrochloride, and Compound (6) is 1-(4'-cyano-4'-p-fluorophenyl-butyl)-4-(o-methoxyphenyl)-piperazine dihydrochloride.

The following examples are given for the purpose of illustrating the present invention.

*Example 1.*—1-(4'-cyano-4'-phenyl-butyl)-4-(m-chlorophenyl)-piperazine (a) PREPARATION OF 1-CHLORO-4-CYANO-4-PHENYL-BUTANE

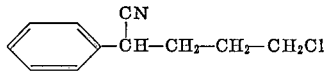

To a suspension of sodium amide in liquid ammonia, prepared from 45 g. of sodium, there is rapidly added a solution of 234 g. of phenyl-acetonitrile in 450 ml. of anhydrous toluene. After evaporation of the ammonia, the resulting suspension is slowly introduced, with stirring, over a period of 90 minutes, into a solution of 500 g. of 1-bromo-3-chloro-propane in 600 ml. of anhydrous toluene. During the course of this operation, the temperature of the reaction medium is maintained between 0 and 10° C. After the addition, the mixture again is stirred for 5 hours at room temperature. The reaction mixture is treated with water and decanted. The organic phase is washed with water and dried. After evaporating the solvent, the residue is distilled under vacuum. 175 g. of 1-chloro-4-cyano-4-phenyl-butane are obtained. Boiling point: 120–125° C. (0.05 mm. Hg).

(b) PREPARATION OF 1-(4'-CYANO-4'-PHENYL-BUTYL)-4-(m-CHLOROPHENYL)-PIPERAZINE

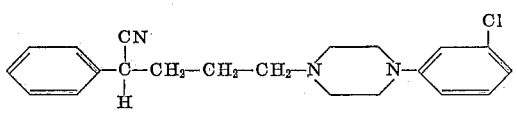

A mixture of 40 g. of m-chlorophenyl-piperazine and 19.4 g. of 1-chloro-4-cyano-4-phenyl-butane is heated for 5 hours at 130–135° C. 400 ml. of anhydrous benzene are added, the mixture is stirred mechanically, while cooling, and filtered. The benzene solution is washed with water, dried and evaporated to dryness. The residue is dissolved in ethanol and treated with an alcoholic solution of hydrogen chloride. The dihydrochloride of the reaction product crystallizes. 31.5 g. of this product are obtained. After recrystallization from ethanol, this dihydrochloride of 1-(4'-cyano-4'-phenyl-butyl)-4-(m-chlorophenyl)-piperazine melts at 197–198° C.

*Example 2.—Preparation of starting materials*

(1) 1-CHLORO-2-METHYL-4-CYANO-4-PHENYL-BUTANE

This compound is prepared by the method described in Example 1(a), from phenylacetonitrile and 1-chloro-2-methyl-3-bromopropane. B.P. 110–115° C. (0.005 mm. Hg).

(2) 1-CHLORO-4-DIMETHYLCARBAMYL-4-PHENYL-BUTANE

This compound is prepared as described in Example 1(a), from the sodium derivative of N,N-dimethyl-2-phenyl-acetamide and 1-chloro-3-bromo-propane. In order to obtain this sodium derivative, it is necessary to heat the reaction mixture. B.P. 130–135° C. (0.01 mm. Hg).

(3) 1-CHLORO-4-CYANO-4,4-DIPHENYL-BUTANE (a) *Preparation of 2-(4'-cyano-4',4'-diphenyl-butoxy)-tetrahydropyrane.*—To a suspension of sodium amide in liquid ammonia, prepared from 11.5 g. of sodium, there is slowly added a solution of 96.5 g. of diphenyl-acetonitrile in 200 ml. of anhydrous toluene. After evaporation of the ammonia, the mixture is heated under reflux until formation of the sodium derivative is complete.

A solution of 89.4 g. of 2-(3'-chloropropoxy)-tetrahydropyrane in 100 ml. of anhydrous toluene is added slowly to the cooled mixture, without exceeding 20° C. The mixture is stirred at ambient temperature for 3 hours and then heated under reflux for 3 hours.

The product is cooled and water added thereto. It is filtered and the toluene layer separated; this layer is washed with water and dried. It is concentrated under vacuum and the residue distilled. There are thus obtained 120.5 g. of 2-(4'-cyano-4',4'-diphenyl-butoxy)-tetrahydropyrane; B.P. 182–185° C. (0.02 mm. Hg).

(b) *Preparation of 4-cyano-4,4-diphenyl-butanol.*—A mixture of 120 g. of 2-(4'-cyano-4',4'-diphenyl-butoxy)-tetrahydropyrane, 220 ml. of ethanol, 200 ml. of water and 35 ml. of concentrated hydrogen chloride are heated under reflux for 90 minutes. The volatile products are then evaporated on a water bath, under a pressure of 10 mm. Hg. The residue is extracted with benzene and the benzene solution washed with water, dried and distilled. 4-cyano-4,4-diphenyl-butanol is obtained in an almost quantitative yield. B.P. 168–172° C. (0.01 mm. Hg).

(c) *Preparation of 1-chloro-4-cyano-4,4-diphenyl-butane.*—90 g. of the 4-cyano-4-4-diphenyl-butanol prepared as in (b) are dissolved in 100 ml. of anhydrous benzene. A few drops of pyridine are added, followed by 35 ml. of thionyl chloride. The mixture is heated under reflux until evolution of gas ceases and the solvent then driven off under vacuum. The residue obtained is purified by trituration with hot petroleum ether (B.P. 40–60° C.) and then crystallized from ethanol. 65 g. of 1-chloro-4-cyano-4,4-diphenyl-butane are obtained; B.P. 93–95° C.

(4) 1-CHLORO-4-CYANO-4-(p-CHLOROPHENYL)-BUTANE

This compound is prepared in the same manner as the previous compound but starting from 2-(4'-cyano-4'-p-chlorophenyl-butoxy)-tetrahydropyrane. B.P. 158–160° C. (0.02 mm. Hg). This butane derivative has a boiling point of 152–154° C. (0.5 mm. Hg).

(5) 1-CHLORO-4-CYANO-4-(p-METHYLPHENYL)-BUTANE

This compound is prepared either as described in Example 1(a) or by the following process:

To a solution of 131 g. of p-methylphenyl-acetonitrile and 315 g. of 1-chloro-3-bromo-propane in 500 ml. of anhydrous toluene, cooled in a mixture of ice and salt, there is added, in portions, and at 0° C., a suspension of one mole of sodium amide in 250 ml. of toluene. When the addition is finished, the temperature is allowed to rise to about 20° C. and stirring is continued for two hours.

The reaction mixture is treated with 500 ml. of water, while stirring and maintaining the temperature close to 20° C. It is decanted, the toluene solution is dried and the solvent evaporated under vacuum. The residue is distilled under high vacuum. 1 - chloro - 4-cyano-4-(p-methylphenyl)-butane is obtained in a yield of 55%. B.P. 138–142° C. (0.01 mm. Hg).

By the same method or by the method as described in Example 1(a), the following substituted butanes are prepared from the corresponding acetonitriles: 1-chloro-4-cyano-(o-methylphenyl)-butane; B.P. 148–152° C. (0.05 mm. Hg), 1-chloro-4-cyano-4-(m-methylphenyl)-butane; B.P. 148–150° C. (0.01 mm. Hg), 1-chloro-4-cyano-4-(o-chlorophenyl)-butane; B.P. 135–140° C. (0.001 mm. Hg), 1 - chloro-4-cyano-4-(m-chlorophenyl)-butane; B.P. 135–140° C. (0.001 mm. Hg), 1-chloro-4-cyano-4-(p-chlorophenyl)-butane; B.P. 152–154° C. (0.5 mm. Hg), 1 - chloro - 4-cyano-4-(p-fluorophenyl)-butane; B.P. 130–135° C. (0.005 mm. Hg), 1-chloro-4-cyano-4-(p-tert.-butylphenyl)-butane; B.P. 150–155° C. (0.001 mm. Hg), 1-chloro-4-cyano-4-(o-methoxyphenyl)-butane; B.P. 150–155° C. (0.05 mm. Hg), 1-chloro-4-cyano-4-(p-methoxyphenyl)-butane; B.P. 152–157° C. (0.3 mm. Hg), 1-chloro - 2 - methyl-4-cyano-4-(p-methylphenyl)-butane; B.P. 105° C. (0.001 mm. Hg), 1-chloro-4-cyano-4-(p-ethylphenyl)-butane; B.P. 157–162° C. (0.05 mm. Hg), and 1-chloro-4-cyano-4-(p-isopropylphenyl)-butane; B.P. 155–160° C. (0.05 mm. Hg).

*Example 3.—1-(4'-cyano-4'-m-methylphenyl-butyl)-4-phenyl-piperazine*

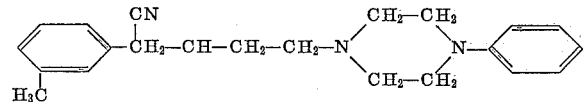

The method described in Example 1(b) is followed using an amine as hydrogen chloride acceptor.

A mixture of 20.7 g. of 1-chloro-4-cyano-4-(m-methylphenyl)-butane, 16.2 g. of phenyl-piperazine, 12 g. of triethylamine and 10 ml. of xylene is heated on an oil bath at 110° C. for 4 to 5 hours. It is cooled and 50 ml. of benzene and 50 ml. of ether are added. The triethylamine hydrochloride formed is filtered off. The filtrate is washed with water and dried over anhydrous sodium sulfate. The solvent is driven off at 100° C. under a pressure of 10 mm. Hg. The residue is taken up in hot alcohol and filtered. To the hot alcoholic solution there is added an alcoholic solution of hydrogen chloride in slight excess (Congo red acidity). The hydrochloride is allowed to crystallize and then recrystallized from boiling ethanol.

23.5 g. of 1-(4'-cyano-4'-m-methylphenyl-butyl)-4-phenyl-piperazine dihydrochloride are obtained; M.P. 210–212° C. (decomp.). Yield: 58%.

In the following table, other compounds are listed which are prepared by the same method, the yields being, in general, between 55 and 75%. In the column headed "HCl," the figure 1 designates the monohydrochloride and the figure 2 the dihydrochloride; in the column headed "M.P.," the figures indicate the melting points of the hydrochlorides expressed in degrees centigrade. These compounds conform to the general formula

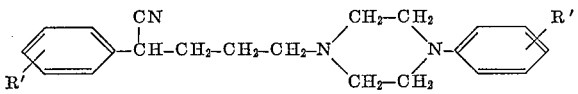

| R' | R'' | HCl | M.P. |
|---|---|---|---|
| m-methyl | H | 2 | 210–212 |
| o-methyl | H | 2 | 235–237 |
| o-methyl | m-methyl | 2 | 232–233 |
| p-methyl | H | 2 | 200–201 |
| m-methyl | m-chloro | 2 | 198–199 |
| o-methyl | o-chloro | 1 | 175 |
| m-methyl | m-methyl | 2 | 208 |
| p-methyl | o-methoxy | 2 | 193–195 |
| m-methyl | o-methoxy | 2 | 188–190 |
| p-methyl | m-methyl | 2 | 208–209 |
| o-methyl | o-methoxy | 2 | 183–185 |
| o-methyl | m-chloro | 1 | 235–236 |
| p-methyl | m-chloro | 2 | 203–204 |
| p-methoxy | m-chloro | 1 | 200–201 |
| m-chloro | m-chloro | 2 | 175–177 |
| m-methyl | o-chloro | 1 | 200–202 |
| m-chloro | H | 2 | 211–213 |
| m-chloro | o-methoxy | 2 | 170–171 |
| p-methyl | o-chloro | 1 | 198–200 |
| m-chloro | m-methyl | 2 | 195–197 |
| p-methoxy | m-methyl | 2 | 182–183 |
| p-methoxy | o-chloro | 1 | 197–198 |
| p-methoxy | H | 2 | 200–201 |
| m-chloro | o-chloro | 1 | 187–188 |
| o-chloro | H | 2 | 211–213 |
| p-t.-butyl | H | 2 | 242 |
| p-methyl | m-methoxy | 2 | 195–197 |
| p-methoxy | m-methoxy | 2 | 197–198 |
| p-t.-butyl | m-methyl | 2 | 225 |
| H | m-methyl | 2 | 205 |
| H | m-methoxy | 2 | 209–211 |
| H | m-trifluoromethyl | 2 | 190–192 |
| p-t.-butyl | m-methoxy | 2 | 207–208 |
| p-t.-butyl | m-chloro | 1 | 230 |
| o-methoxy | H | 2 | 190–192 |
| o-chloro | m-methyl | 2 | 205–207 |
| o-methoxy | m-methyl | 2 | 188–189 |
| o-chloro | m-chloro | 2 | 216 |
| o-methoxy | m-chloro | 1 | 223 |
| p-chloro | m-methyl | 2 | 208 |
| p-chloro | H | 2 | 218–220 |
| H | H | 2 | 225–227 |
| p-chloro | o-methoxy | 2 | 206–208 |
| p-methyl | o-methoxy | 1 | 225 |
| H | o-methoxy | 2 | 195–196 |
| H | o-methyl | 1 | 235 |
| p-chloro | o-methyl | 1 | 220–221 |
| p-methyl | 2,5-dimethyl | 1 | 230 |
| p-methyl | 2,5-dimethoxy | 2 | 185–186 |
| p-fluoro | o-methoxy | 2 | 197–199 |
| p-methoxy | o-methoxy | 1 | 233–235 |
| p-fluoro | o-methyl | 2 | 216–218 |
| p-fluoro | H | 2 | 234–235 |
| p-methoxy | o-methoxy | 2 | 178–179 |
| H | o-chloro | 2 | 169–171 |
| H | p-chloro | 2 | 221–223 |
| p-chloro | p-chloro | 2 | 206–208 |
| p-ethyl | H | 2 | 194–195 |
| p-ethyl | o-methyl | 2 | 213–215 |
| p-isopropyl | o-methoxy | 2 | 204 |
| p-isopropyl | H | 2 | 205–207 |
| p-isopropyl | o-methyl | 2 | 246–248 |

The following compounds, which conform to the general Formula I given in column 1, may also be prepared either by the process described in Example 1(b) or by the process described in Example 3:

1-(4'-cyano-4',4'-diphenyl-butyl)-4-phenyl-piperazine:
  Melting point of the base, 91–93° C.

Melting point of the monohydrochloride, 238–240° C.

1-(2'-methyl-4'-cyano-4'-p-methylphenyl-butyl)-4-o-methoxyphenyl-piperazine:
  Melting point of the monohydrochloride, 160° C.

1-(4'-dimethylcarbamyl-4'-phenyl-butyl)-4-phenyl-piperazine:
  Melting point of the dihydrobromide, 201–203° C.

*Example 4.—1-(4'-carbamyl-4'-phenyl-butyl)-4-phenyl-piperazine*

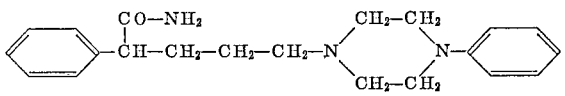

15 g. of 1-(4'-cyano-4'-phenyl-butyl)-4-phenyl-piperazine dihydrochloride in 35 ml. of 90% sulfuric acid are heated on a water bath for 3 hours. The reaction product is poured on to ice. It is then rendered alkaline with sodium hydroxide. The crude product crystallizes out and is filtered off and washed with water. 11.2 g. of 1-(4'-carbamyl-4'-phenyl-butyl)-4-phenyl-piperazine are obtained; M.P. 150–152° C. After recrystallization from dilute ethanol, it melts at 153–154° C.

The dihydrochloride is prepared by treatment in ethanol with hydrogen chloride. After recrystallization from methanol, it melts at 210–211° C.

The following piperazine derivatives have been prepared by this method.

*1-(4'-carbamyl-4'-phenyl-butyl)-4-(m-chlorophenyl)-piperazine*

Melting point of the monohydrochloride (recrystallized from ethanol), 201–203° C.
Melting point of the base, 137–139° C.

*1-(4'-carbamyl-4'-phenyl-2'-methyl-butyl)-4-phenyl-piperazine*

Melting point of the dihydrochloride (crystallized from ethanol), 205–206° C. (decomp.).

*1-(4'-carbamyl-4'-phenyl-butyl)-4-(o-chlorophenyl)-piperazine*

Melting point of the base (crystallized from dilute ethanol,) 143–144° C.

*1-(4'-carbamyl-4'-p-chlorophenyl-butyl)-4-(p-chlorophenyl)-piperazine*

Melting point of the monohydrochloride (crystallized from ethanol), 237–239° C.

*1-(4'-carbamyl-4'-p-chlorophenyl-butyl)-4-phenyl-piperazine*

Melting point of the base (crystallized from ethanol), 191° C.
Melting point of the dihydrochloride (crystallized from ethanol), 218–220° C.

*Example 5. — 1-(4',4'-diphenyl-4'-pyrrolidino-carbonyl-butyl)-4-(m-chlorophenyl)-piperazine*

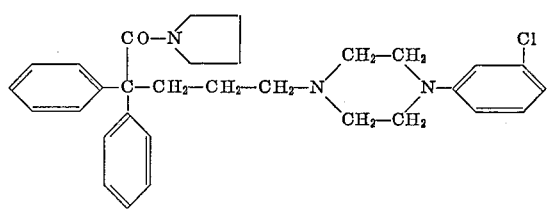

To a suspension of sodium amide, prepared from 1.62 g. of sodium in liquid ammonia, there are added 18.6 g. of N-diphenyl-acetyl-pyrrolidine dissolved in 100 ml. of anhydrous toluene. The mixture is heated under reflux to form the sodium derivative. It is then cooled to about 80° C. and 19.2 g. of 1-m-chlorophenyl-4-(3'-chloropropyl)-piperazine, dissolved in 50 ml. of toluene, are added.

The mixture is stirred for several hours and then heated under reflux for 5 hours.

The reaction mixture is treated with water and filtered. It is decanted and the organic solution washed with water. The organic layer is extracted with dilute hydrogen chloride. The acid extract is then rendered alkaline and extracted with benzene. The benzene extract is evaporated and the residue recrystallized from ethyl acetate. The base melts at 159–160° C.

The corresponding dihydrochloride, crystallized from an ethanol-ether mixture, melts at 175–176° C. (decomp.).

All the products described in Example 1(b) and 3 may also be prepared according the process of this example.

I claim:
1. A compound selected from the group consisting of the piperazine bases of the formula

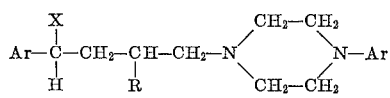

wherein Ar represents a member selected from the group consisting of phenyl and substituted phenyl wherein the only substituents on the phenyl nucleus are selected from the group consisting of halogen, trifluoromethyl, lower alkyl and lower alkoxy, R represents a member selected from the group consisting of hydrogen and methyl, and X is selected from the group consisting of —CN and

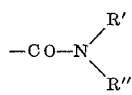

where R' and R'' taken separately each represents a member of the class consisting of hydrogen and lower alkyl and taken together and with the adjacent nitrogen atom represent pyrrolidino, and salts of the said bases having pharmaceutically acceptable anions.

2. 1 - (4' - cyano - 4' - p - chlorophenyl - butyl) - 4-phenyl-piperazine.

3. 1 - (4' - cyano - 4' - phenyl - butyl) - 4 - (m-chlorophenyl)-piperazine.

4. 1 - (4' - cyano - 4' - phenyl - butyl) - 4 - (o - methoxyphenyl)-piperazine.

5. 1 - (4' - cyano - 4' - p - methylphenyl - butyl) - 4-(o-methoxy-phenyl)-piperazine.

6. 1 - (4' - cyano - 4' - p - methoxyphenyl - butyl) - 4-o-chlorophenyl)-piperazine.

7. 1 - (4' - cyano - 4' - p - methoxyphenyl - butyl) - 4-(o-methoxyphenyl)-piperazine.

8. 1 - (4' - cyano - 4' - o - methoxyphenyl - butyl) - 4-phenyl-piperazine.

9. 1 - (4' - cyano - 4' - p - chlorophenyl-butyl) - 4-(o-methoxyphenyl)-piperazine.

10. 1 - (4' - cyano - 4'- p - fluorophenyl - butyl) - 4-(o-methoxyphenyl)-piperazine.

11. 1 - (4' - cyano - 4' - p - methoxyphenyl - butyl)-4-(o-methoxyphenyl)-piperazine.

12. 1 - (4' - cyano - 4' - p - ethylphenyl-butyl) - 4-(o-methylphenyl)-piperazine.

13. 1 - (4' - carbamyl - 4' - phenyl - butyl) - 4 - (m-chlorophenyl)-piperazine.

References Cited by the Examiner
UNITED STATES PATENTS

| | | | |
|---|---|---|---|
| 2,174,568 | 10/39 | Davies et al. | 260—465 |
| 2,446,804 | 8/48 | Bergel et al. | 260—465 |
| 2,790,819 | 4/57 | Godfrey | 260—465 |
| 2,793,226 | 5/57 | Schlesinger et al. | 260—268 |
| 2,919,274 | 12/59 | Faust et al. | 260—465 |
| 3,030,367 | 4/62 | Janssen | 260—268 |
| 3,068,236 | 12/62 | Krapcho | 260—268 |
| 3,145,209 | 8/64 | Krapcho | 260—268 |

FOREIGN PATENTS

| | | |
|---|---|---|
| 540,057 | 8/55 | Belgium. |
| 332,334 | 10/58 | Switzerland. |

NICHOLAS S. RIZZO, *Primary Examiner.*